United States Patent Office

3,527,853
Patented Sept. 8, 1970

3,527,853
PROCESS FOR MANUFACTURING SEMIPERMEABLE CELLULOSE ACETATE MEMBRANES SUITABLE FOR DESALINATION
Martin E. Rowley, Hilton, and Nelson G. Baumer, Rochester, N.Y., assignors to Eastman Kodak Company, Rochester, N.Y., a corporation of New Jersey
No Drawing. Filed Feb. 29, 1968, Ser. No. 709,195
Int. Cl. B29d 7/02; C08b 3/06
U.S. Cl. 264—49            7 Claims

ABSTRACT OF THE DISCLOSURE

A process has been found in which conventional cellulose acetate "hydrolysis baths" can be utilized directly (without a separate step in which the partially hydrolyzed cellulose acetate is precipitated) in overall processes for manufacturing cellulose acetate membranes that are particularly useful for purifying salty water, for example, as "reverse osmosis" membranes. The "hydrolysis baths" contain cellulose acetate, acetic acid, water, and a sulfuric acid catalyst. The present processes involve, initially, reacting the sulfuric acid with an organic amine, casting the resulting dope in the form of a film and then subjecting the surface of the film to a stream of "drying" gas.

This invention relates to special processes for preparing semipermeable membranes directly from conventional so-called "hydrolysis baths" in which cellulose triacetate has been partially hydrolyzed.

BACKGROUND

Membranes made from cellulose acetates containing from about 32 to about 43% acetyl (i.e., "partially hydrolyzed" cellulose acetates) have been developed fairly recently for use in so-called "reverse osmosis" processes for purifying brackish and other types of saline water. Such membranes are made by special procedures whereby a special type of "skin" or layer of selectively effective porosity (for preventing the passage of unwanted dissolved salts through the membrane while simultaneously permitting passage of purified water through the membrane) is formed on the surface of the film or membrane. It is apparently the presence of the special "skin" that endows these membranes with their valuable selective nature.

In general, processes for manufacturing useful "reverse osmosis" membranes involve the steps of (a) preparing a solution or "dope" of (1) one or more suitable film forming polymeric materials and usually (2) one or more special "pore-producing" materials, dissolved in a substantially organic solvent system; (b) casting the dope in the form of a film; (c) evaporating a portion of the organic solvents from a surface of the resulting cast solution (to thereby cause the solution to set up in the basic form of the membrane and form the "skin" referred to above); (d) subjecting the resulting membrane to a treatment wtih liquid water (usually by immersion); (e) and sometimes subjecting the washed membrane to a subsequent heat treatment (herein called "tempering"). For certain other uses, the "skin" is not required to be so highly preferential with respect to salts dissolved in the water.

It is known that only certain polymeric film forming materials such as cellulose esters and/or ethers can be used successfully for this purpose. It was also believed that the use of only certain organic solvents resulted in the formation of acceptable "reverse osmosis" membranes. Similarly only a limited number of materials can function as successful "pore-producing" materials.

As a matter of fact, to date, the number of useful solvent systems and useful "pore-producing" materials that have been discovered and disclosed is extremely limited. Examples of conventional solvent and "pore-producing" materials as well as examples of conventional processes for manufacturing useful "reverse osmosis" membranes and for using the membranes can be found in U.S. Pats. 3,344,214; 3,133,132; 3,133,137, and 3,342,728, as well as South African Pat. 670799/67.

Very recently, a new class of effective "pore-producing" materials was discovered. That class of materials includes the organic amine salts of strong inorganic acids such as sulfuric acid, phosphoric acid, and the like.

THE PROBLEM

The film-forming material which to date has proved to be the most satisfactory is partially hydrolyzed cellulose acetate containing from about 32 to about 43 percent acetyl and having an intrinsic viscosity from about 0.5 to about 2.3. The most economical method of making this type of partially hydrolyzed cellulose acetate involves initially reacting cellulose with acetic anhydride to thereby yield cellulose triacetate, and subsequently partially hydrolyzing the triacetate to the desired acetyl level. The use of such an apparently round-about method of obtaining a certain level of acetyl is apparently necessary because it enables one to obtain partially hydrolyzed product having generally better physical qualifications in a much more readily controlled process that would otherwise be possible. Generally, the partial hydrolysis of cellulose triacetates is accomplished by heating the cellulose triacetate dissolving in a mixture of acetic acid and a small amount of water in the presence of a small amount of a strong acid catalyst such as sulfuric acid.

Heretofore, in order to manufacture or formulate the concentrated dopes that were to be utilized in conventional processes for manufacturing reverse osmosis membranes made from cellulose acetate, it was believed necessary to first recover the partially hydrolyzed cellulose acetate from hydrolysis bath (containing the acetate dissolved in a mixture of acetic acid, water, and sulfuric acid). In such prior processes (such as those disclosed in the patents mentioned above) the relatively pure cellulose acetate was then simply dissolved in the solvent or solvent mixture that was believed necessary in order to manufacture acceptable membranes.

One can readily appreciate that a desirable improvement in the overall processes for manufacturing acceptable reverse osmosis membranes from cellulose acetates would be the direct utilization of the hydrolysis bath. Thus, the separation step as well as the redissolution step described above could be eliminated. However, because of the stringent requirements that were believed necessary heretofore such as the apparent necessity to eliminate the sulfuric acid from the system, the apparent need to utilize only certain specific solvent systems (which did not include mixtures of water and acetic acid), as well as the apparent necessity to utilize only certain "pore-producing" materials that may or may not be compatible and/or effective in acetic acid-water solvent systems made the direct usage of such hydrolysis baths seem to be beyond even the possibility of success.

THE PRESENT INVENTION

It has now been discovered that cellulose acetate hydrolysis baths can be used practically directly, provided that, (a) the sulfuric acid hydroylsis catalyst is converted into a new type of "pore-producing" material (an effective organic amine sulfate), and (b) the evaporation step (in general overall membrane manufacturing process described hereinbefore) is encouraged by forcing passage of a gas such as air across the surface of the cast film of the concentrated dope (to thereby cause the formation of the desired specially selective "skin" on the surface of the film).

The conversion of the sulfuric acid in the "hydrolysis bath" into the effective pore producing organic amine sulfate can readily be accomplished by simply blending into the bath an effective amount (preferably from about 0.5 to about 2.5 moles) of a useful organic amine per mole of sulfuric acid in the bath. For optimum results, about 2 moles of the amine per mole of sulfuric acid should be used.

Typical examples of amines that can be utilized succesfully in the practice of this invention include, but are not limited to, pyridine, triethylamine, triethanolamine, diethanolamine, alpha-picoline, beta-picoline, lutidine, N,N-dimethylaniline, 2-aminoethanol, monoisopropanolmonoethylamine, and diisopropanolamine, (all of these amines having molecular weights of at most about 400).

The "hydrolysis baths" described above are well known to those in the cellulose ester manufacturing art. They generally contain, for example, from about 15 to about 40 (preferably from about 20 to about 35) weight percent of the partially hydrolyzed cellulose acetate (which in turn contains from about 32 to about 43, and preferably from about 38 to about 41, weight percent of acetyl), from about 59 to about 84 weight percent (and preferably from about 65 to about 80 weight percent) of acetic acid, and from about 0.02 to about 5 (and preferably from about 0.1 to about 2) weight percent of sulfuric acid, and from about 0.2 to about 10 (preferably from about 0.5 to about 5) weight percent of water (but not enough water to cause the cellulosic material in the bath to be precipitated).

The necessary passage of forced air (or other gas into which the acetic acid and water solvent mixture can readily be evaporated) can be accomplished in a number of ways in the successful practice of this invention. Thus, the gas can be simply blown in any of a number of conventional ways directly onto the surface of the cast "dope" under a slight positive pressure (for example, at least about one-half p.s.i.) so that at least about 100 mls. of gas per minute (preferably at least about 200 mls. of gas per minute) is passed over each square inch of surface of the cast dope. In this manner, provided that the gas is not already effectively saturated with acetic acid and/or water, the rate of evaporation of solvent(s) from the cast "dope" film is increased substantially and an acceptable membrane can thereby be produced in a practical period of time. Typical useful gases other than air are nitrogen, carbon dioxide, and argon.

Example 1

Thirty pounds of cellulose containing 7% moisture are loaded into a conventional acetylation mixture along with 95 pounds of acetic acid. The resulting mixture is blended for 30 minutes at a temperature of 110° F. Into this mixtuer is then added 124.3 grams of sulfuric acid dissolved in 200 grams of acetic acid. The resulting blend is mixed at 110° F. for 5 minutes. Its temperature is then quickly lowered to 75° F. whereupon 85 pounds of acetic anhydride are then blended into it. The resulting anhydrous mixture is subsequently cooled to 60° F. before 790 grams of sulfuric acid dissolved in 900 grams acetic acid is intermixed with it. The resulting acetylation bath (containing sulfuric acid catalyst) is then warmed to a temperature of 140° F. and maintained at this temperature for approximately 30 minutes until an intrinsic viscosity of 1.2 is obtained.

1362 grams of the resulting mixture (containing cellulose in the form of triacetate) is then hydrolyzed by first blending into it a mixture of 136 grams of water and 250 grams of acetic acid and subsequently maintaining the temperature of the resulting hydrolyzing reaction mixture at a temperature of 100° F. for about 24 hours until a partially hydrolyzed cellulose acetate containing 40% acetyl results. The hydrolysis reaction is then stopped by blending into it 2 mols of pyridine per mole of sulfuric acid in the "hydrolysis bath."

The resulting concentrated dope is then cast on a glass plate at room temperature to thereby form a film having a thickness of 10 mils. The film is permitted to stand for 10 seconds under ambient conditions and then is subjected to a stream of moving air at room temperature. The volume of the stream of moving air is about one liter per square inch of film per minute. The plate is then submerged into water maintained at a temperature of 34° F. for five minutes and subsequently washed for an additional 10 minutes with water at room temperature and stripped from the glass plate. The resulting membrane is then tempered for 4 minutes in warm (170° F.) water and tested for its ability to function well as a reverse osmosis membrane by subjecting the "skin" side of it to brackish water containing 55 hundred parts per million of sodium chloride under 600 pounds per square inch pressure. Results of this test indicate that a flux of 33.5 gallons/square foot/day can be obtained with a salt rejection rate of 82.5%.

Example 2

A concentrated dope solution such as that prepared in Example 1 above is cast continuously onto a moving belt of poly(ethylene terephthalate) to form a continuous membrane about 6 inches wide. In this example, the moving belt containing the cast concentrated dope solution is subjected practically immediately after the film is cast to a stream of dry nitrogen for 43 seconds. The stream of nitrogen is directed onto the surface of the film through a perforated plastic diffuser under a positive pressure of 2 pounds per square inch. The coated polyester belt is then passed through a 34° F. water bath (being immersed therein for 4 minutes), stripped from the polyester belt, washed for 5 minutes in room temperature water and subsequently tempered (without intermediate drying) for 4 minutes in a 170° F. water bath to yield a membrane that passes 28.5 gallons of water per square foot per day with a 94% salt rejection when tested as described in Example 1 above.

The invention has been described in detail with particular reference to preferred embodiments thereof, but it will be understood that variations and modifications can be effected within the spirit and scope of the invention as described hereinabove and as defined in the appended claims.

I claim:
1. A process for manufacturing a semi-permeable membrane, which process comprises
   (a) preparing a concentrated dope directly from a cellulose acetate hydrolysis bath containing from about 15 to about 40 weight percent of a partially hydrolyzed cellulose acetate having from about 32 to about 43 percent acetyl; from about 84 to about 59 weight percent of acetic acid; from about 0.1 to about 10 weight percent of water; and from about 0.02 to about 5 weight percent of sulfuric acid catalyst by blending into said hydrolysis bath from about 0.5 to about 2.5 moles of an organic amine (having a molecular weight of at most about 400) per mole of said sulfuric acid;
   (b) casting said concentrated dope in the form of a film;
   (c) evaporating a portion of the solvent from the resulting cast film by subjecting one surface of said cast film to a stream of gas at a rate of at least about 100 mls. gas/per minute per square inch of said surface to thereby increase the rate of evaporation of acetic acid and water from said film; and
   (d) subsequently immersing the partially dried film into water to thereby remove at least the greatest part of the resulting amine sulfate from said film.

2. An improved process as in claim 1 wherein said cellulose acetate has an acetyl value of from about 38 to about 41 and said concentrated dope contains from about 0.1 to about 2 weight percent of sulfuric acid, from about 0.5 to about 5 weight percent of water and from about 65 to about 80 weight percent of acetic acid.

3. An improved process as in claim 2, wherein said stream of gas is a stream of air and said rate is at least about 200 mls. per minute per square inch of said surface.

4. An improved process as in claim 3, wherein said gas is nitrogen.

5. An improved process as in claim 1, wherein said organic amine is selected from the group consisting of pyridine, triethylamine, triethanolamine, diethanolamine, alpha-picoline, beta-picoline, lutidine, N,N-dimethylaniline, 2-aminoethanol, 1-aminoethanol, diisopropanolamine and isopropanolethylamine.

6. An improved process as in claim 5, wherein the molar ratio of said amine to said sulfuric acid is about 2:1, respectively.

7. An improved process as in claim 6, wherein said amine is pyridine.

References Cited

UNITED STATES PATENTS

| 2,541,012 | 2/1951 | Bruins et al. | 106—196 |
| 3,290,286 | 12/1966 | Kesting | 264—49 XR |
| 3,364,288 | 1/1968 | Loeb | 264—217 XR |
| 3,432,584 | 3/1969 | Cannon et al. | 264—41 XR |

OTHER REFERENCES

F. H. Peakin: "The Sulfates of Pyridine." In Journal of The Society of The Chemical Industry, vol. 59, pp. 56–7 (1940).

U.S. Office of Saline Water: "Reverse Osmosis For Water Desalination," by H. K. Lonsdale et al. Research and Development Progress Report No. 111, May 22, 1964, pp. 99 and 104.

S. Manjikian: "Improvement In Fabrication Techniques For Reverse Osmosis Desalination Membranes," First International Symposium on Water Desalination, Oct. 3–9, 1965, Washington, D.C., pps. 1–7 and 13.

PHILIP E. ANDERSON, Primary Examiner

U.S. Cl. X.R.

106—186, 196; 210—500; 264—217